US010429215B2

(12) United States Patent
Bravo Solis et al.

(10) Patent No.: US 10,429,215 B2
(45) Date of Patent: Oct. 1, 2019

(54) LED BEAM DISPLAY FOR INTERIOR AUTOMOTIVE APPLICATIONS

(71) Applicant: Continental Automotive Systems, Inc., Auburn Hills, MI (US)

(72) Inventors: Maria Nohemi Bravo Solis, Tlaquepaque (MX); Manuel Hernandez Diaz, Zapopan (MX); Carlos Ivan Ruiz Larios, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 138 days.

(21) Appl. No.: 14/502,227

(22) Filed: Sep. 30, 2014

(65) Prior Publication Data

US 2016/0091345 A1 Mar. 31, 2016

(51) Int. Cl.
*G01D 11/28* (2006.01)
(52) U.S. Cl.
CPC .................................... *G01D 11/28* (2013.01)
(58) Field of Classification Search
None
See application file for complete search history.

(56) References Cited

U.S. PATENT DOCUMENTS

| | | | | |
|---|---|---|---|---|
| 5,949,346 A * | 9/1999 | Suzuki | ................... | B60K 37/02 116/286 |
| 6,224,216 B1 | 5/2001 | Parker et al. | | |
| 6,671,008 B1 * | 12/2003 | Li | ........................... | B82Y 15/00 349/16 |
| 7,750,821 B1 * | 7/2010 | Taborisskiy | ........... | B60K 35/00 340/461 |
| 9,022,606 B2 * | 5/2015 | Radl | ..................... | F21V 7/0008 362/231 |
| 2006/0202993 A1 * | 9/2006 | Birman | .................. | G02B 6/005 345/426 |
| 2007/0274102 A1 * | 11/2007 | Bohme | .................. | G02B 6/006 362/616 |
| 2009/0219730 A1 * | 9/2009 | Syfert | .................... | B60K 37/02 362/489 |
| 2010/0064962 A1 * | 3/2010 | Birman | .................. | G01D 11/28 116/288 |
| 2011/0032214 A1 * | 2/2011 | Gruhlke | ................. | G02B 5/045 345/175 |

(Continued)

FOREIGN PATENT DOCUMENTS

| | | |
|---|---|---|
| CN | 101950517 A | 1/2001 |
| CN | 1598901 | 3/2005 |

*Primary Examiner* — Elmito Breval

(57) ABSTRACT

A vehicle instrument cluster having a viewing area that is a planar non-glossy reflective surface. In one embodiment of the invention the viewing area is a black color. The vehicle instrument cluster further includes two or more light emitting diodes each having a light emission surface positioned to selectively project a light beam pattern onto the reflective surface visible on the viewing area. The light beam pattern creates a character or icon on the viewing surface, or the light beam pattern is combined with other light beam patterns from the other two or more light emitting diodes to create a character or icon on the viewing surface. The light beam pattern can be selectively changed between two or more colors projected from the light emission surface.

5 Claims, 2 Drawing Sheets

(56) References Cited

U.S. PATENT DOCUMENTS

| | | | |
|---|---|---|---|
| 2011/0044021 A1* | 2/2011 | Kato | G01D 11/28 |
| | | | 362/23.2 |
| 2011/0156588 A1* | 6/2011 | Brant | B60Q 1/50 |
| | | | 315/77 |
| 2013/0241886 A1 | 9/2013 | Eriksson et al. | |
| 2014/0036472 A1* | 2/2014 | Ishihara | F21V 33/00 |
| | | | 362/23.14 |

* cited by examiner

LED BEAM DISPLAY FOR INTERIOR AUTOMOTIVE APPLICATIONS

FIELD OF THE INVENTION

The present invention relates to light emitting diode beam display arrangements for vehicle instrument clusters.

BACKGROUND OF THE INVENTION

In the field of vehicle instrument clusters, often times values on clusters are displayed electronically. One typical method involves using segments of light emitting diodes or liquid crystals that are illuminated in connection with adjacent or nearby segments to form a digital numeric value. Projection of the light in this manner is usually carried out by providing a display screen containing different segments that are energized to cause the segments to project light directly toward a viewing zone. The light presented by the illuminated segments is a single color that cannot be changed without a filter(s). Also, the light projected is bound by the boundary of the segment and cannot be blended with adjacent segments. It is therefore desirable to provide an arrangement that allows for more color variation and blending of light segments. It is also desirable to provide a more natural light source instead of illuminating a single segment directly by transmission.

SUMMARY OF THE INVENTION

A vehicle instrument cluster having a viewing area that is a planar non-glossy reflective surface. In one embodiment of the invention the viewing area is a black color. The vehicle instrument cluster further includes two or more light emitting diodes each having a light emission surface positioned to selectively project a light beam pattern onto the reflective surface visible on the viewing area. The light beam pattern creates a character or icon on the viewing surface, or the light beam pattern is combined with other light beam patterns from the other two or more light emitting diodes to create a character or icon on the viewing surface. The light beam pattern can be selectively changed between two or more colors projected from the light emission surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
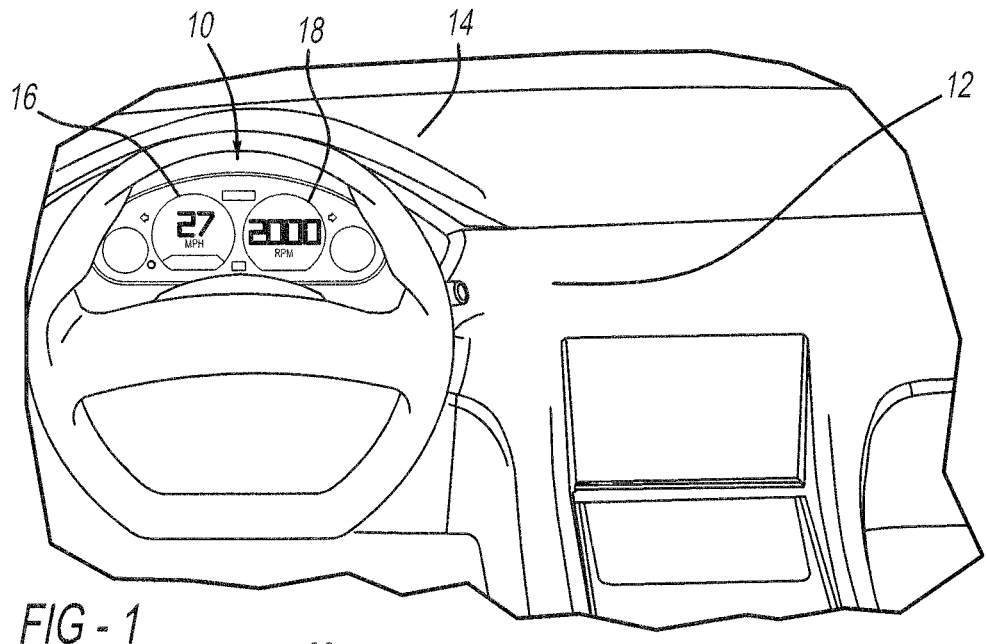
FIG. 1 is a perspective environmental view of a vehicle instrument cluster used in an interior of a vehicle.

Referring now to FIGS. 1-4, with specific reference to FIG. 1, a vehicle instrument cluster 10 is shown in an interior of a vehicle 12. In particular, the instrument panel 10 shown in FIG. 1 is connected to an instrument panel 14 of the vehicle 12 interior. The vehicle instrument cluster 10 shown has two different gauges which include a speedometer 16 and tachometer 18. The speedometer 16 and tachometer 18 show several different characters or numbers which are visible on a reflective surface 20. The reflective surface is a single surface or several surfaces located next to each other to express a series of numbers or characters.

Figure 2:
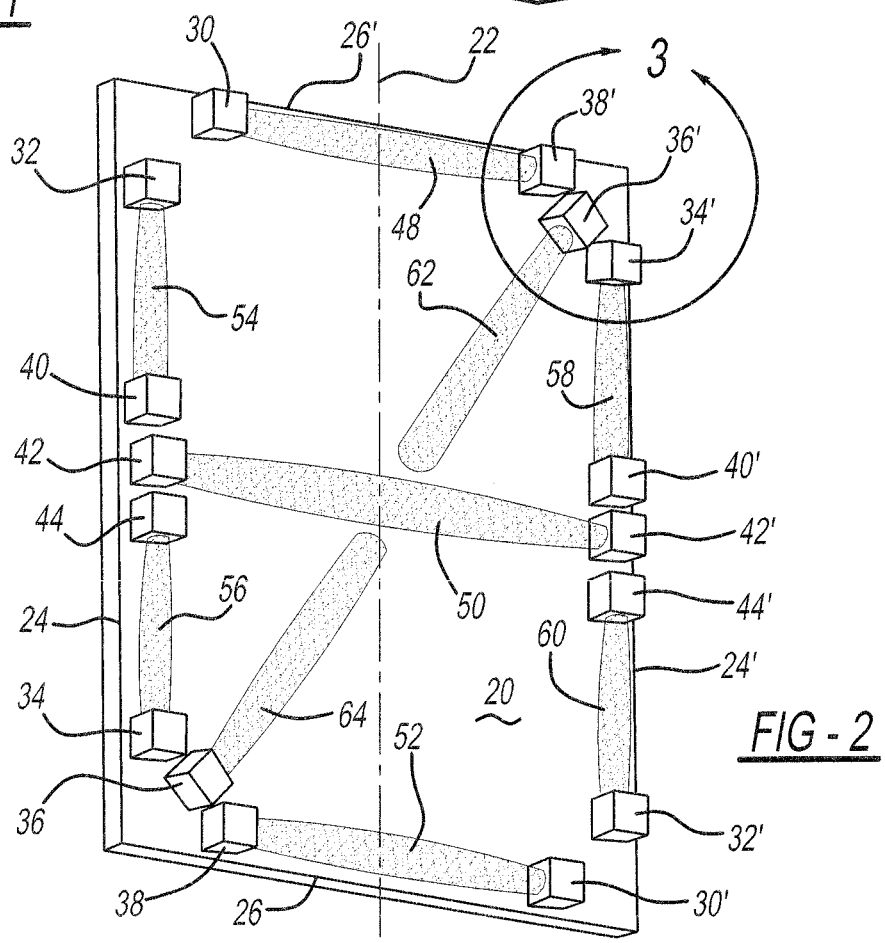
FIG. 2 is an angled side perspective view of a vehicle instrument cluster in accordance with one embodiment of the invention.
Figure 3:
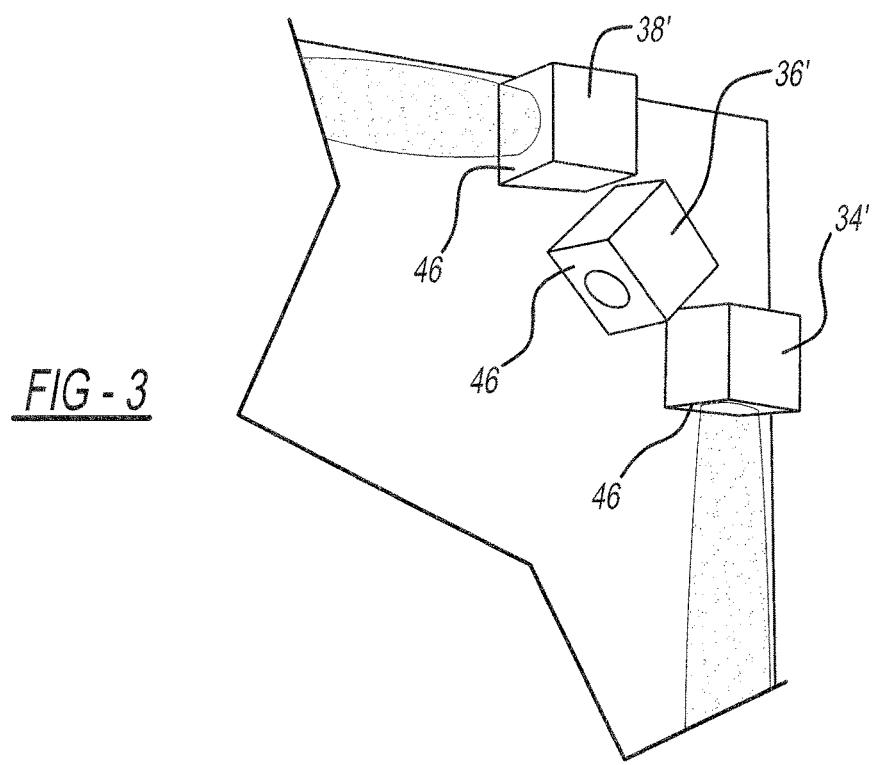
FIG. 3 is an enlarged perspective view of a cluster of light emitting diodes of the vehicle instrument cluster.
Figure 4:
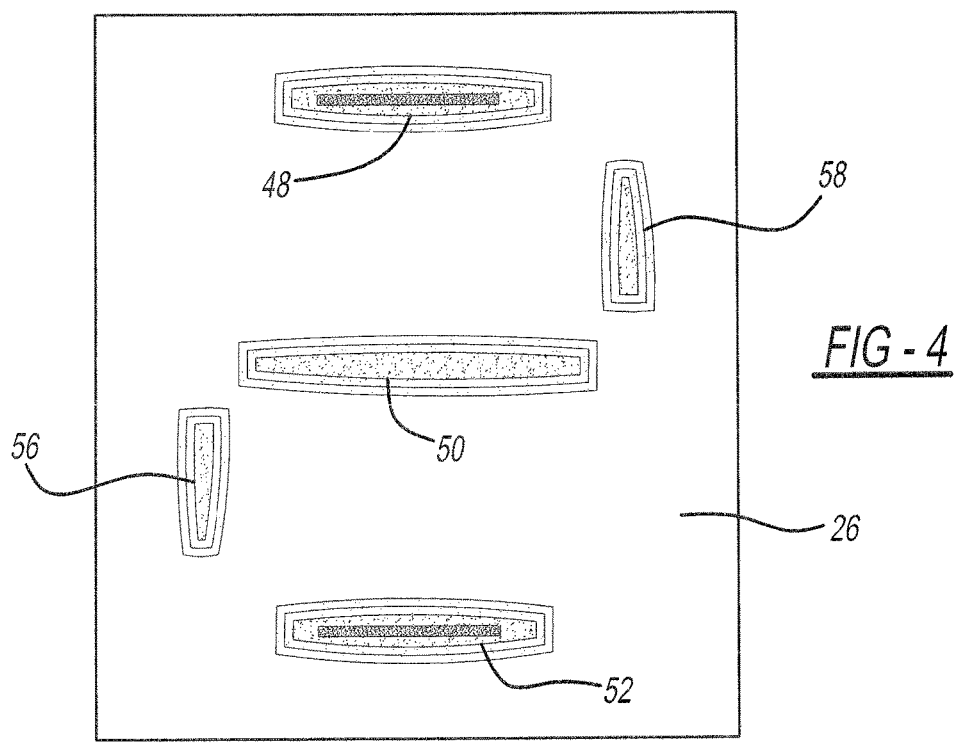
FIG. 4 is a front plan view of an illuminated vehicle instrument cluster.

Referring now to FIGS. 2-4, one embodiment of the vehicle instrument cluster 10 is shown in greater detail with the single reflective surface 20, which has a central longitudinal axis 22 that extends parallel to the plane of the reflective surface 20. The reflective surface 20 in a preferred embodiment of the invention is a non-glossy planar surface, which is preferably black or dark in color in order to reflect the beams of light projected onto the surface. However, it is within the scope of this invention for the reflective surface to be a lighter color, such as white, and be a glossy surface.

FIG. 2 shows the reflective surface 20 as having a generally rectangular shape having two parallel long sides 24, 24' and two parallel short sides 26, 26'. While the reflective surface 20 is shown as having a rectangular shape, it is within the scope of this invention for the reflective surface 20 to have other shapes such as circular, triangular, square, hexagonal, trapezoidal, or any rhombus.

FIG. 2 has a total of 16 light emitting diodes (LEDs). It is also within the scope of this invention for the LEDs to be a laser or laser beam outputs from a single laser. The LEDs as shown in FIG. 2 are arranged along the two parallel long sides 24, 24' of the reflective surface. In particular, one of the two parallel long sides 24 has one group of two LEDs 30, 32 located at one end of the parallel long side 24. Parallel long side 24 also has one group of three LEDs 34, 36, 38 located at a second end of the parallel long side 24 and a second group of three LEDs 40, 42, 44 located generally in the middle of the parallel long side 24 between the first end and the second end.

The second parallel long side 24' has a similar grouping of LEDs as the first side, but with their location being inverse to the LEDs on the long side 24. For example, the second long side 24' has one group of two LEDs 30', 32' located at one end of the long side 24' positioned diagonally across from the one group of two LEDs 30, 32 located on the parallel long side 24. One group of three LEDs 34', 36', 38' is located at a second end of the long side 24' and is positioned diagonally across from the one group of three LEDs 34, 36, 38 of the parallel long side 24. A second group of three LEDs 40', 42', 44' is located in the middle of the long side 24' and is positioned directly across the second group of three LEDs 40, 42, 44 of the parallel long side 24.

Each of the LEDs 30, 30', 32, 32', 34, 34', 36, 36', 38, 38', 40, 40', 42, 42', 44, 44' has a light emitting surface 46 that emits a beam of light in a specific pattern. While the present embodiment of the invention does not use any type of lens or cover on the light emitting surface 46 for controlling the light beam pattern, it is within the scope of this invention for a lens to be placed on the light emission surface in order to control the light beam pattern projected from the light emission surface 46. Each of the LEDs 30, 30', 32, 32', 34, 34', 36, 36', 38, 38', 40, 40', 42, 42', 44, 44' has the light emission surface 46 positioned at an angle less than ninety degrees to the plane of the reflective surface 20 so that the light beam emitted from each of the LEDs is projected onto and reflects from the reflective surface 20, so that the light is viewable by a person using the vehicle instrument display cluster 10. The speedometer 16 and tachometer 18 shown in FIG. 1 have numbers that are created using projected light from the LEDs as shown in FIGS. 2-4.

Referring to FIG. 2, it can be seen that the vehicle instrument cluster 10 has three horizontal light beams 48, 50, 52, four longitudinal light beams 54, 56, 58, 60, and two light diagonal beams 62, 64 that are projected from the various light emission surfaces 46 of the individual LEDs 30, 30', 32, 32', 34, 34', 36, 36', 38, 38', 40, 40', 42, 42', 44, 44', thereby creating the various light beam patterns on the reflective surface 20. The term horizontal, as used in FIG. 2, means perpendicular to the axis 22, longitudinal to the means parallel axis 22 and diagonal means diagonal to the axis 22.

The individual LEDs are selectively illuminated in order to project light patterns that will look like numbers or characters on the reflective surface 20. For example, FIG. 4 shows light beam patterns that are projected and look like the number two. FIG. 2 shows all of the light beams being selectively turned on and it is evident that any type of number and several letters can be created by selectively turning on the various beams. As shown in FIG. 2, the first group of three LEDs 34, 34', 36, 36', 38, 38', located at each end of the parallel long sides 24, 24' have one LED 36, 36' that faces diagonally toward each other, which allows for the number seven to be created by projecting the two diagonal beams 62, 64 onto the reflective surface 20. It is also within the scope of this invention to add additional LEDs. For example, instead of having one group of two LEDs 30, 30', 32, 32' located on each of the two parallel long sides 24, 24', it is within the scope of this invention to add an additional LED that will project a diagonal light beam, which would allow for creating an 'X' type of character when the diagonally positioned LEDs are illuminated.

While FIG. 2 depicts a single reflective surface 20 used to create a single character or number, it is within the scope of this invention to have more than sixteen LEDs that are spaced across a larger reflective surface 20 in order to project several numbers or characters on a single reflective surface 20.

Referring now to FIG. 4, an illustrated example of a number two is shown by projecting the three horizontal beam patterns 48, 50, 52 and two of the longitudinal beam patterns 56, 58. Another feature of the present invention is that the beam patterns can change color or have different colors blended into the projected beam pattern. For example, as shown in FIG. 4, horizontal beam patterns 48, 52 has a red tint, while horizontal beam pattern 50 and the two longitudinal beam patterns 56, 58 have a green color with no red color being present. It is within the scope of this invention for the entire projected beam to be able to change colors by controlling the various LEDs, and does not necessarily require the use of light filters in order to accomplish color change. It is further within the scope of this invention for the light beam patterns to have different colors within the same beam pattern in order to give a multi-color beam pattern.

The vehicle instrument cluster 10 is shown and described as being a speedometer 16 or tachometer 18; however, it is within the scope of this invention for the vehicle instrument cluster 10 in accordance with the present invention to be used in connection with any type of display or instrument cluster. For example, it is also within the scope of this invention for the vehicle instrument cluster 10 to be incorporated into a radio or clock used to display a light beam pattern that represents at least two characters on a viewing area. It is further within the scope of this invention for the vehicle instrument cluster 10 to be used in connection with an infotainment display in the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle instrument cluster comprising:
   a non-glossy reflective surface having a viewing area; and
   a plurality of light emitting lasers, each laser emitting visible light onto the viewing area of the non-glossy surface, in a corresponding predetermined direction across the non-glossy surface;
   wherein each laser is configured to selectively project a light beam pattern onto the viewing area of the non-glossy surface so as to be visible on the viewing area, and
   wherein the shape of the light beam pattern projected onto the viewing area of the non-glossy surface by the light emitting diodes is a portion of a number.

2. The vehicle instrument cluster of claim 1 wherein the non-glossy surface is substantially planar.

3. The vehicle instrument cluster of claim 2 wherein the non-glossy surface is black.

4. The vehicle instrument cluster of claim 1 wherein the vehicle instrument cluster is a speedometer used to display a light beam pattern that represents at least two characters on the viewing area.

5. The vehicle instrument cluster of claim 1 wherein the vehicle instrument cluster is a display for a radio or clock used to display a light beam pattern that represents at least two characters on the viewing area.

* * * * *